United States Patent [19]

Lochner

[11] 4,295,984

[45] * Oct. 20, 1981

[54] PASTE-LIKE, VISCOUS DAMPING MEDIUM COMPRISING POLYGLYCOL ETHERS AND/OR ESTERS

[76] Inventor: Kaspar Lochner, Karlsburgstr. 7b, 8000 München, Fed. Rep. of Germany

[*] Notice: The portion of the term of this patent subsequent to Feb. 17, 1998, has been disclaimed.

[21] Appl. No.: 81,381

[22] Filed: Oct. 3, 1979

[51] Int. Cl.³ .............................................. C04B 43/00
[52] U.S. Cl. ...................................... 252/62; 181/294
[58] Field of Search ................. 252/62, 72, 22, 23, 252/29, 30, 309; 181/294; 179/180

[56] References Cited

U.S. PATENT DOCUMENTS

| 2,711,394 | 6/1955 | Veatch et al. | 252/30 |
| 3,244,626 | 4/1966 | Lyons et al. | 252/29 |
| 3,812,937 | 5/1974 | Abbott et al. | 252/72 X |

FOREIGN PATENT DOCUMENTS 2647697 4/1978 Fed. Rep. of Germany.

Primary Examiner—Harris A. Pitlick
Attorney, Agent, or Firm—Armstrong, Nikaido, Marmelstein & Kubovcik

[57] ABSTRACT

The invention relates to a paste-like, viscous damping medium dispersion based on a liquid phase and graphite, where at least one agent for increasing the intrinsic viscosity and at least one wetting agent for wetting the graphite are added to the dispersion. The dispersion according to the invention is free-flowing over a very large temperature range, does not increase in hardness when under load but remains viscous, and is noise-insulating. The dispersion according to the invention does not swell elastomers.

24 Claims, No Drawings

PASTE-LIKE, VISCOUS DAMPING MEDIUM COMPRISING POLYGLYCOL ETHERS AND/OR ESTERS

BACKGROUND OF THE INVENTION

The invention relates to a paste-like damping medium dispersion for damping mechanical and acoustic vibrations It is known to use as damping medium an aliphatic or aromatic carboxylic acid ester to which ground graphite and at least one wetting agent are added. The paste-like damping medium dispersions according to the aforementioned application have the disadvantage that they swell elastomers, e.g. on the basis of natural caoutchouc.

The U.S. Pat. No. 3,244,626 (Lyons et al) describes a lubricant comprising a mineral oil and 20 to 40% graphite as thickening substance. This lubricant contains no polyglycol ether or polyglycol ester, no viscosity stabilisers and no wetting agents. It is not suitable as a damping medium dispersion because the lubricant becomes liquid at raised temperatures. Furthermore, the known lubricant based on mineral oil attacks elastomers, thus having a destructive effect on the elastomer components of correspondingly constructed dampers.

The U.S. Pat. No. 2,711,394 (Veatch et al) describes a lubricating liquid comprising a mixture of mineral oil, graphite and aluminium silicates as gelling agent. This lubricating liquid has a viscosity of only 350 to 550 modified Furol seconds at 37.8° C. It should be so thin that it can be applied as lubricating liquid to sliding surfaces with a brush. There is thus no viscous paste involved here either. An important difference between this known lubricating liquid and the plastic, highlyviscous paste according to the invention is that the former contains 87.5 to 96% mineral oil, thus being completely unsuitable for dampers with elastomer components, e.g. engine mountings.

The U.S. Pat. No. 3,812,937 (Abbott et al) describes a lubricant which contains petroleum oil and in which up to 20% of a special montmorillonite is dispersed. The composition and the properties of this lubricant are not comparable with the special composition of the highly-viscous dispersion according to the invention. The known lubricant furthermore attacks elastomers, with the result that the elastomer components of the damper are destroyed prematurely.

A damping medium dispersion was thus needed which does not foam under permanent load, shows good thermal conductivity, is self-sealing and does not attack elastomers based on natural caoutchouc or caoutchouc/isoprene. The damping medium should show a constant shock-absorbing and vibration-damping effect both at low and at high temperatures and also under permanent load. It should take up the energy of shock loads imposed by high and also low-frequency vibrations and convert it into heat. The damping medium may not undergo any hardening under sudden shock load because it should also have a noise-damping effect, especially on so-called body noise. It is also desirable for the dispersion to be noise-insulating.

An essential object of the invention is that the elastomer components contained in some dampers, e.g. engine mountings, are not swollen by the damping medium dispersion.

SUMMARY OF THE INVENTION AND DESCRIPTION OF PREFERRED EMBODIMENTS

Subject of the application are thus paste-like, viscous damping medium dispersions, characterized in that they contain polyglycol ethers and/or esters and perhaps saturated aliphatic or aromatic carboxylic acid esters, ground graphite, at least one wetting agent and an agent for increasing the intrinsic viscosity e.g. silicone compounds and/or aluminium silicate.

For the liquid phase, hydrophobic ethers and/or esters which are either insoluble or only very slightly soluble in water are used with preference. The polyglycol ethers and/or esters have a viscosity of approx. 10 cSt to 1000 cSt at 50° C., in particular of approx. 20 to 300 cSt at 50° C. If polyglycol ethers and/or esters with a low viscosity are used, the viscosity of the ether or the mixture employed is approx. 30 to 50, in particular 40 cSt at 50° C. A preferably-used lowviscosity polyalkylene ether mixture is e.g. the polyglycol ether Hoechst VP 15 63/40 and/or Union Carbide LB 300.

If hydrophobic polyglycol ethers or polyglycol ether mixtures of medium viscosity are used, the viscosity is approx. 70 to 90, in particular approx. 80 cSt at 50° C. The polyalkylene glycol ether Hoechst B 01/80 and/or Union Carbide LB 625 are used with preference.

If hydrophobic polyglycol ethers or polyalkylene glycol ethers of high viscosity are used, the viscosity is approx. 170 to 200 cSt, in particular 180 cSt at 50° C. A polyalkylene glycol ether used with preference is e.g. the polyglycol ether Union Carbide LB 1800.

The polyglycol ethers and/or esters used according to the invention have a solidification point preferably of about −50° to 0° C., in particular between −40° and −10° C.

The hydrophobic polyglycol ethers and/or esters used according to the invention have a relative average molecular weight of approx. 700 to 20000, in particular approx. 1100 to 3800 and preferably approx. 1100 to 2300.

The polypropylene glycol monopropylethers have a viscosity preferably of 300 to 10000 cSt at 50° C., a relative average moleculare weight of approx. 5000 to 20000 and a solidification point (German Standards DIN 51550) of approx. −10 to ±0. The polypropylene glycol monobutyl ethers used preferably have, e.g., a viscosity of 50 to 700 cSt or 20 to 240 cSt at 50° C., a relative average moleculare weight of approx. 1200 to 3800 or approx. 700 to 2300 and a solidification point (DIN 51583) of −50° to −35° C. or −50° to −40° C.

Especially suitable for the damping medium dispersions according to the invention are, in particular, the polyglycol mono and/or diethers of the polyethylene, polypropylene or polybutylene glycols. The ether groups of the mono and/or diethers comprise saturated, straight-chain or branched alkoxy groups with 1 to 10 C atoms, in particular 2 to 6 C atoms. Especially suitable are e.g. the polyethylene glycol monoethylethers, propylethers, butylethers and pentylethers, the polypropylene glycol monomethylethers, ethylethers, propylethers, butylethers and pentylethers, and the polybutylene glycol monomethylethers, ethylethers, propylethers, butylethers, pentylethers and hexylethers, and mixtures of these.

The hydrophobic polyglycol mono and/or diesters of the polyethylene, polypropylene or polybutylene glycols and the monoesters of the polyglycol ethers are also suitable for the paste-like damping medium dispersions according to the invention. Of particular importance are e.g. the mono- and diesters of the stearic, oleic and lauric acids of the aforementioned polyglycols. By choosing a polyglycol with a longer or a shorter chain one can influence the hydrophilic-lipophilic balance of the ester. The diesters are generally more strongly lipophilic than are the monoesters.

The content of the polyglycol ethers and/or esters according to the invention comprises about 40 to 70% by weight, in particular 50 to 60% by weight, based on the total weight of the dispersion.

In addition to the polyglycol ethers and/or esters the damping medium dispersion according to the invention can also contain a silicon oil with a viscosity of approx. 10 cSt to 1000 cSt at 50° C. Methyl and/or methyl phenyl silicone oils have proved particularly useful.

Mineral oils with a viscosity of approx. 10 cSt to 1000 cSt at 50° C., preferably at least about 50 cSt at 50° C., and a flashpoint of at least 160° C. can be used in addition. One example of this group are machine oils with a viscosity of 100 to 200 cSt at 20° C. and a flashpoint of 190° to 220° C. (DIN 51515).

If aliphatic saturated carboxylic acid esters are used, suitable esters are e.g. those of saturated aliphatic monohydric or polyhydric $C_5$-$C_{12}$ alcohols with saturated aliphatic $C_5$-$C_{12}$ monocarboxylic acids.

Suitable aliphatic saturated diesters include the esters of saturated aliphatic monohydric or polyhydric $C_5$-$C_{12}$ alcohols with saturated aliphatic $C_5$-$C_{12}$ dicarboxylic acids. Suitable aromatic diesters are, in particular, the esters of aliphatic saturated monohydric or polyhydric $C_5$-$C_{12}$ alcohols with phthalic acid, terephthalic acid and isophthalic acid. Suitable aromatic tricarboxylic acid esters include especially the esters of aliphatic saturated monohydric or polyhydric $C_5$-$C_{12}$ alcohols with benzene tricarboxylic acids. These esters can be used in addition.

The quantitative ratios between liquid phase and graphite are adjusted accordingly, depending on the required viscosity of the dispersion. A high viscosity necessitates a relatively high graphite content, the quantities of graphite also being governed by the particle size of the graphite used. For a given viscosity, the proportion of liquid phase is greater the larger the graphite particles used. By suitably selecting the particle size and/or quantity of graphite used, the viscosity of the dispersion can be adjusted within certain limits.

Graphite of flake-form and/or nodular structure is added to the liquid phase according to the invention. The particle size of the graphite should not exceed 100μ, better 50μ. Graphite particle sizes of 5 to 10μ are especially suitable. It is also possible to use mixtures of graphite particles of different sizes. The graphite is added in amounts of 30 to 70% by weight, in particular 35 to 60% by weight, based on the total weight of the dispersion. The preferred quantity of graphite amounts to 40 to 60% by weight, based on the total weight of the dispersion.

The damping medium dispersion according to the invention contains at least one wetting agent that prevents solid particles from sedimenting in the dispersion. The wetting agents are added in quantities of approx. 0.1 to 8% by weight, in particular 0.5 to 6% by weight and preferably 1.5 to 5% by weight, based on the total weight of the dispersion. The particular quantity is governed by the diameter of the graphite particles. The larger the graphite particles, the less wetting agent is required. The wetting agents used are, in particular, wetting soaps among which the amine soaps of fatty acids have proved to be particularly suitable. Suitable are, e.g., the amine compounds of tallow fatty acid, stearic acid, palmitic, linoleic and/or oleic acid, e.g. tallow fatty acid diamine, coconut fatty acid diamine and/or oleic acid diamine.

It is advantageous to add to the dispersion according to the invention agents which stabilize the intrinsic viscosity of the dispersion. Suitable here are, e.g., amorphous silicon dioxide and finely ground aluminium silicates, especially also organophilic bentonites. These viscosity stabilisers preferably have a grain size of less than 0.5μ, more especially 0.1μ. The quantities in which they are added range from approx. 0.1 to 10, especially 0.5 to 5 and preferably 1 to 2% by weight, based on the total weight of the dispersion. Additions of finely ground asbestos have also proved to be of advantage.

The damping medium dispersions according to the invention can also contain antioxidants. The antioxidants may be used in a quantity of at least 0.1% by weight, for example, based on the total weight of the dispersion. Suitable antioxidants are, for example, phenol and thiophenol compounds of the type described in Ullmann's Enzyklopädie, Vol. 15, pages 217 to 220. Sterically hindered amino and phenol derivatives, for example the diphenyl amine, phenyl-α-naphthyl amine and/or phenothiazine, are especially suitable for use in the dispersions according to the invention.

The damping medium dispersions according to the invention, using hydrophobic polyglycol ethers and/or esters, do not tend to foam when under permanent load since they show good thermal conductivity. The thermal conductivity of the dispersions according to the invention is in the range of 2 to 4, more especially 2 to 3.5 (cal)/(cm)(sec) (°C.)

The damping medium dispersions according to the invention are self-sealing, resistant to mineral oils and show high viscosity stability over a wide range of temperature. The dispersion does not harden under sudden shock load but remains plastic and viscous. The viscosity of the dispersions according to the invention is from about $1-4\times10^6$ cP at 25° C., more especially from about 1.5 to $3\times10^6$ cP at 25° C. Even if the damping medium is subjected to a sudden load at high speed, e.g. when the dispersion is used in a lift damper or in an impact damper, the dispersion does not harden but remains free-flowing and homogeneous. It is important that the dispersion also remains free-flowing at temperatures below 0° C. The viscosity and the plasticity—i.e. the rheology of the dispersion—does not undergo any significant change if the dispersion is heated at normal pressure up to temperatures of 300° C. If the dispersion is under pressure, it can be exposed for a short time to temperatures up to 400° C. without any change in the damping characteristic.

An extremely important feature of the dispersion according to the invention is that it does not separate—i.e. solid particles in the dispersion do not sediment—even under pressure and/or permanent tensile load.

The damping medium dispersions according to the invention are resistant to aging and are neutral towards elastomers, especially towards elastomers based on natural caoutchouc or synthetic caoutchouc. The rubber parts of the damper which come into contact with the damping medium dispersions according to the invention are not swollen by the dispersion, which means that the durability of the corresponding rubber parts is considerably increased.

The damping medium dispersions according to the invention have the further advantage that they absorb shock loads both of large and of small amplitude, i.e. the kinetic energy is converted into frictional heat which is rapidly dissipated. An important property of the damping medium dispersion according to the invention is that the so-called body noise vibrations are not transmitted by the dispersions, i.e. the dispersion according to the invention is noise-insulating.

The non-Newtonian damping medium dispersions according to the invention are explained in more detail by means of the following examples, although the invention is not limited to these examples.

EXAMPLE 1

The polyalkylene glycol ether, the tallow fatty acid diamine and the diphenyl amine were mixed well, the organophilic bentonite was then added and the graphite subsequently worked into this mixture, using a cylinder mill, under pressure until the dispersion was homogeneous.

| Components | Wt. % |
| --- | --- |
| Polyalkylene glycol ether (Hoechst VP 1563/40), Viscosity 40 mm²/sec at 50° C. (40cSt at 50° C.) | 50 |
| Tallow fatty acid diamine (wetting agent) | 3 |
| Diphenylamine (Antioxidant) | 2 |
| Organophilic bentonite (Bentone 34 from the firm Titan Gesellschaft) | 1 |
| Natural graphite, purity 99% Particle size max. 5 μ | 44 |

According to DIN 53 521, 5 sheets (2 mm thick) and 2 sheets (6 mm thick) of vulcanized natural caoutchouc 14C.11=40 Shore and 16 C.11=60 Shore were left in the aforementioned damping medium dispersion for 72 hours at room temperature and at 100° C. The elastomer strips were then taken out of the dispersion, cleaned and weighed. The elastomer strips did not show any increase in weight and were not swollen.

On storing the dispersion under pressure at 40° C. for 14 days, according to the IPI 121 of the Amer. Petr. Inst., a liquid quantity of 0.8% was separated.

At a shear speed of up to 4 m/sec the dispersion remains free-flowing, homogeneous and shows no signs of decomposition. Tests have not yet been carried out at higher shear speeds. It is assumed that the dispersions according to the invention can be subjected to shear speeds of up to 8 m/sec. The antioxidant can be left out without the rheological properties of the dispersion being disadvantageously influenced.

EXAMPLE 2

| Components | Wt. % |
| --- | --- |
| Hydrophobic polypropylene glycol monobutyl ether (Hoechst B 01/80) Viscosity 80 mm²/sec at 50° C. (80cSt at 50° C.) | 55.5 |
| Coconut fatty acid diamine (wetting agent) | 4 |
| Phenyl-α-naphthylamine (antioxidant) | 2 |
| Organophilic bentonite | 1 |
| Natural graphite, purity 99% Particle size max. 5 μ | 37.5 |

According to DIN 53 521, strips of vulcanized natural caoutchouc were tested as in Example 1. The strips showed no increase in weight and were not swollen.

EXAMPLE 3

| Components | Wt. % |
| --- | --- |
| Hydrophobic polyalkylene glycol ether (Viscosity: 180 mm²/s at 50° C. Union Carbide LB 1800) | 54 |
| Oleic acid diamine (wetting agent) | 3 |
| Organophilic bentonite | 2 |
| Natural graphite, purity 99.5% Particle size 5 to 10 μ | 41 |

Strips of vulcanized natural caoutchouc (according to DIN 53 521) were dipped into the aforementioned dispersion and left in this dispersion for 72 hours at 100° C. The strips were taken out of the dispersion, cleaned and weighed. The strips showed no increase in weight and were not swollen.

If desired, 1 to 2% by weight of an antioxidant can be added to the aforementioned dispersion without the rheological properties being disadvantageously influenced. Example of such an antioxidant is phenothiazine.

What is claimed is:

1. A paste-like, viscous damping medium dispersion for damping mechanical and acoustic vibrations, comprising polyglycol ethers and/or polyglycol esters having a viscosity of about 10 cSt to 1000 cSt at 50° C. and a relative average molecular weight of about 700 to 20000; 30 to 70% by weight of ground graphite having a particle size of less than 100μ, 0.1 to 8% by weight of a wetting agent and 0.1 to 10% by weight of finely ground aluminum silicate or amorphous silicon dioxide as a viscosity stabilizer, the % weight being based in each case on the total weight of the dispersion, the viscosity of the dispersion being about (1 to 4)×10⁶ cP at 25° C.

2. Dispersion according to claim 1, characterized in that the polyglycol ethers and/or esters are either insoluble or only very slightly soluble in water.

3. Dispersion according to claim 2, characterized in that the polyglycol ethers and/or esters have a viscosity of about 40 cSt to 300 cSt at 50° C.

4. Dispersion according to claim 1, characterized in that the polyglycol ethers and/or esters have a solidification point between −50° C. and 0° C., a relative average molecular weight of about 1100 to 3800.

5. Dispersion according to claim 1, characterized in that the polyglycol ethers are the mono and/or diethers of the polyethylene, polypropylene or polybutylene glycols.

6. Dispersion according to claim 5, characterized in that the ether group of the mono or diether is a saturated, straight-chain or branched alkoxy group with 1 to 10 C atoms.

7. Dispersion according to claim 1, characterized in that the polyglycol ether is a polyethylene glycol monoethyl ether, monopropyl ether or monobutyl ether, a polypropylene glycol monoethyl ether, monopropyl ether or monobutyl ether, a polybutylene glycol monomethyl ether, monoethyl ether, monopropyl ether, monobutyl ether or monopentyl ether.

8. Dispersion according to claim 1, characterized in that the polyglycol esters are the mono and/or diesters of the polyethylene, polypropylene or polybutylene glycols.

9. Dispersion according to claim 1, characterized in that the polyglycol esters are the monoesters of the polyethylene, polypropylene or polybutylene glycol monoethers.

10. Dispersion according to claim 1, characterized in that the polyglycol ethers and/or esters are present in a quantity of about 40 to 70% by weight, based on the total weight of the dispersion.

11. Dispersion according to claim 1, characterized in that it contains 0.5 to 6% by weight of wetting agent, based on the total weight of the dispersion.

12. Dispersion according to claim 11, characterized in that it contains about 1.5 to 5% by weight of wetting agent.

13. Dispersion according to claim 1, characterized in that the wetting agent is a fatty acid amine selected from the group consisting of tallow fatty acid diamine, coconut fatty acid diamine, oleic acid diamine, linoleic acid diamine, palmitic acid diamine and mixtures thereof.

14. Dispersion according to claim 1, characterized in that it contains as viscosity stabilizer about 0.5 to 5 of amorphous silicon dioxide and/or finely ground aluminium silicate, based on the total weight of the dispersion.

15. Dispersion according to claim 14, characterized in that it contains, as aluminium silicate, bentonite with a particle size of less than $0.5\mu$.

16. Dispersion according to claim 1, characterized in that the quantity of graphite comprises about 35 to 60% by weight, based on the total weight of the dispersion.

17. Dispersion according to claim 16, characterized in that the graphite has a particle size of at most $50\mu$.

18. Dispersion according to claim 1, characterized in that the viscosity is about 1.5 to $3 \times 10^6$ cP at 25° C.

19. Dispersion according to claim 1, characterized in that the thermal conductivity of the dispersion is 2 to 4 (cal)/(cm)(sec)(°C.).

20. Dispersion according to claim 1, characterized in that it further contains antioxidant in a quantity of at least 0.1% by weight, based on the total weight of the dispersion.

21. Dispersion according to claim 20, characterized in that the antioxidants are substituted phenols or aromatic amines.

22. Dispersion according to claim 1, characterized in that it further contains a silicone oil having a viscosity of at least 20 cSt at 25° C.

23. Dispersion according to claim 1, characterized in that it further contains a saturated aliphatic or aromatic mono-, di- or tricarboxylic acid ester.

24. In a method of damping mechanical and acoustic vibrations employing a damping device having a chamber containing a damping medium, the improvement comprising employing as the damping medium a paste-like, damping meduim dispersion comprising polyglycol ethers and/or polyglycol esters having a viscosity of about 10 cSt to 1000 cSt at 50° C. and a relative average molecular weight of about 700 to 20000, 30 to 70% by weight of ground graphite having a particle size of less than $100\mu$, 0.1 to 8% by weight of a wetting agent and 0.1 to 10% by weight of a finely ground aluminum silicate or amorphous silicon dioxide as a viscosity stabilizer, the % weight being based in each case on the total weight of the dispersion, the viscosity of the dispersion being about $(1 \text{ to } 4) \times 10^6$ cP at 25° C.

* * * * *